(12) United States Patent
Dolphin et al.

(10) Patent No.: US 7,897,728 B2
(45) Date of Patent: Mar. 1, 2011

(54) PROCESS FOR MAKING A LOW MOLECULAR WEIGHT GELATINE HYDROLYSATE

(75) Inventors: John M. Dolphin, Sioux City, IA (US); Jason D. Russell, Sioux City, IA (US)

(73) Assignee: Gelita AG, Eberbach (DE)

( * ) Notice: Subject to any disclaimer, the term of this patent is extended or adjusted under 35 U.S.C. 154(b) by 388 days.

(21) Appl. No.: 11/908,503

(22) PCT Filed: May 31, 2006

(86) PCT No.: PCT/EP2006/005179

§ 371 (c)(1), (2), (4) Date: Nov. 14, 2007

(87) PCT Pub. No.: WO2006/128685

PCT Pub. Date: Dec. 7, 2006

(65) Prior Publication Data

US 2008/0275140 A1    Nov. 6, 2008

(51) Int. Cl.
- C09H 3/00 (2006.01)
- A61K 38/17 (2006.01)
- A61K 9/48 (2006.01)
- C12N 9/50 (2006.01)
- C12N 9/54 (2006.01)
- C12N 9/62 (2006.01)

(52) U.S. Cl. ............... 530/354; 424/456; 435/219; 435/221; 435/225

(58) Field of Classification Search ............... 530/354; 424/456; 435/219, 221, 225
See application file for complete search history.

(56) References Cited

U.S. PATENT DOCUMENTS

| | | |
|---|---|---|
| 3,930,050 A | 12/1975 | Faber |
| 3,962,384 A | 6/1976 | Cannalonga et al. |
| 4,176,199 A | 11/1979 | Vollmer et al. |
| 4,299,847 A | 11/1981 | Morris |
| 4,355,146 A | 10/1982 | Nakamura et al. |
| 4,729,897 A | 3/1988 | Poppe et al. |
| 4,992,100 A | 2/1991 | Koepff et al. |
| 5,227,157 A | 7/1993 | McGinity et al. |

(Continued)

FOREIGN PATENT DOCUMENTS

EP    0 392 006    10/1990

(Continued)

OTHER PUBLICATIONS

Enzyme Nomenclature (Nomenclature Committee of the International Union of Biochemistry and Molecular Biology (NC-IUBMB), online version, search for neutral proteases, http://www.googlesyndicatedsearch.com/u/queenmary?q=neutral+protease&hq=inurl%3Awww.chem.qmul.ac.uk%2Fiubmb%2Fenzyme, printed from the Internet on Mar. 16, 2010.*

(Continued)

Primary Examiner — Karen Cochrane Carlson
Assistant Examiner — Rosanne Kosson
(74) Attorney, Agent, or Firm — Leydig, Voit & Mayer, Ltd.

(57) ABSTRACT

The present invention provides a process to make a gelatine hydrolysate, a gelatine hydrolysate, and gelatine compositions including gelatine hydrolysates. More specifically, the invention provides gelatine compositions having a reduced tendency to cross-link and improved dissolution properties.

7 Claims, 1 Drawing Sheet

U.S. PATENT DOCUMENTS

| | | | |
|---|---|---|---|
| 5,618,689 | A * | 4/1997 | McCarthy et al. .......... 435/68.1 |
| 6,372,282 | B1 * | 4/2002 | Edens et al. ................. 426/656 |
| 6,455,067 | B1 | 9/2002 | Woo et al. |
| 6,465,209 | B1 | 10/2002 | Blinkovsky et al. |
| 6,548,077 | B1 | 4/2003 | Gunasekaran |
| 2002/0044968 | A1 | 4/2002 | Van Lengerich |
| 2002/0164681 | A1 | 11/2002 | Lafargue et al. |
| 2002/0165359 | A1 | 11/2002 | Lafargue et al. |
| 2003/0166149 | A1 | 9/2003 | De Bruin et al. |
| 2003/0224361 | A1 | 12/2003 | Qiao et al. |
| 2004/0175428 | A1 | 9/2004 | Appel et al. |

FOREIGN PATENT DOCUMENTS

| | | |
|---|---|---|
| EP | 0 984 703 B1 | 4/2003 |
| FR | 2 586 030 | 2/1987 |
| JP | 03008435 | 1/1991 |
| WO | WO 94/25580 | 11/1994 |
| WO | WO 97/43910 | 11/1997 |
| WO | WO 98/51163 | 11/1998 |
| WO | WO 03/090726 | 11/2003 |
| WO | WO 03/103582 | 12/2003 |
| WO | WO 2004/010974 | 2/2004 |
| WO | WO 2004/065507 | 8/2004 |

OTHER PUBLICATIONS

Enzyme Nomenclature (Nomenclature Committee of the International Union of Biochemistry and Molecular Biology (NC-IUBMB), online version, search for subclass 3.4.24, http://www.chem.qmul.ac.uk/iubmb/enzyme/EC3/4/24/, printed from the Internet on Mar. 16, 2010.*
Adesunloye, T. A., et al., *Drug Development and Industrial Pharmacy*, 24(6):493-500 (1998).
Adler-Nissen, J., *J. Agric. Food Chem.*, 27(6):1256-1262 (1979).
Adler-Nissen, J., "Enzymic Hydrolysis of Food Proteins", *Elsvier Applied Science Publishers Ltd.*, p. 122 (1986).
Albert, K. et al., *Z. Naturforsch*, 41b:351-358 (1986).
Carstensen, J. T., et al., *Drug Development and Industrial Pharmacy*, 19(20):2709-2712 (1993).
Church, F. C., et al., *J. of Dairy Sci.*, 66:1219-1227 (1983).
Davis, P., et al., *J. Polym. Sci. Part A.*, 1:799-815 (1963).
Digenis, G. A., et al., *J. Pharm. Sc.*, 83(7):915-921 (1994).
Fraenkel-Conrat, H., et al., *J. Am. Chem. Soc.*, 67(6):950-954 (1945).
Fraenkel-Conrat, H., et al., *J. Am. Chem. Soc.*, 68(1):34-37 (1946).
Fraenkel-Conrat, H., et at., *J. Am. Chem. Soc.*, 70(8):2673-2684 (1948).
Gold, T. B., et al., *Pharm. Dev. Tech.*, 1(1):21-26 (1996).
Gutsaliuk, V. M. et al., *Ukr Biokhim Zh*, 63(5):39-45 with English Abstract from Pub Med (1991), Abstract only.
Huang, Y., *Chinese Journal of Polymer Science*, 22(6):599-602 (2004).
Ivanov, C., et al., "Synthesis and Characterizations of Natural Polymers Hydrogels used in Pharmacological Applications", *Technical University ,, Gh. Asach of Iasi, Faculty of Industrial Chemistry, Department of Macromolecules*, Romania, Google search of the title, 2 pages, printed from the Internet 2005.
Kim, S.-K., et al., *J. Agric. Food Chem.*, 49:2992-2997 (2001).
Kokil, S. N., et al., http://www/aapspharmscitech.org, Article 41, submitted Mar. 8, 2004; accepted Jun. 8, 2004, pp. 1-10.
Kozlov, M., et al., *Polymer*, 24:651-666 (1983).
Marks, E. M., et al., *Food Tech.*, 221:1433-1436 (1968).
Matsuda, S., et al., *J. Biomed Mater. Res.*, 45(1): 20-27 (1999).
Metz, B. et al., *J. Bio. Chem.*, 279(8):6238-6243 (2004).
Nagaraj, R. H., et al., *J. Biol. Chem.*, 271(32):19338-19345 (1996).
Nielsen, P. M., et al., *J. of Food Sci.*, 66(5):642-646 (2001).
Offner III, C. M. et al., *J. of Pharm. Sci.*, 90(1):79-88 (2001).
Okamoto, M., et al., *Appl. Microbial Biotechnol*, 57:103-108 (2001).
Phillips, A. L., et al., *J. Anim. Sci.*, 78:1861-1866 (2000).
Ramo Rao, K. V. et al., *Pharmaceutical Technology*, pp. 54-63 (2003).
Ramo Rao, K. V. et al., *Pharmaceutical Technology*, pp. 42-46 (2002).
Singh, S., et al., *Pharmaceutical Technology*, pp. 36-58 (2002).
Ward, A. G. et al., *Academic Press Inc.*, pp. 231-233 (1977).

* cited by examiner

Figure 1

PROCESS FOR MAKING A LOW MOLECULAR WEIGHT GELATINE HYDROLYSATE

This application is a United States national stage application of International Application No. PCT/EP06/05179 filed May 31, 2006, which claims priority to U.S. application Ser. No. 11/140,863 filed on May 31, 2005 and which issued as U.S. Pat. No. 7,485,323, each of which is hereby incorporated by reference in its entirety.

FIELD OF THE INVENTION

The present invention generally relates to a gelatine hydrolysate, a process for making the gelatine hydrolysate, and a composition comprising the gelatine hydrolysate. More specifically, the present invention provides a low molecular weight gelatine hydrolysate having a high primary amine content, to a process for making the gelatine hydrolysate, and to a gelatine composition including gelatine hydrolysate.

BACKGROUND OF THE INVENTION

Gelatine is manufactured by the denaturation of collagen contained in materials such as pig skin, cattle skin or hide, and animal bones. Like its parent protein, collagen, gelatine is defined by a distinctive structure comprising a unique blend of amino acids. Native collagen is a scleroprotein based on a polypeptide chain comprising approximately 1050 amino acids. Three of these polypeptide chains come together to form a triple helix. Superimposition of several of these triple helices produces fibrils of collagen that are stabilized by cross-linking, hence forming a three-dimensional network structure. This particular structure renders collagen insoluble; it is then brought into soluble form by partial hydrolysis as gelatine or gelatine hydrolysate. The amino acid content of collagen and hence of gelatine, is about one third glycine and a further 22% proline and 4-hydroxyproline; the remaining 45% comprise 17 different amino acids. Gelatine has a particularly high content of acidic and basic amino acids. Of the acidic amino acids (glutamic acid and aspartic acid), variable amounts are present in the amido form as glutamine and asparagine depending on the processing conditions used in the gelatine manufacturing process. Cysteine is completely absent; of the sulphur-containing amino acids, methionine is the only one present.

The data for poultry and fish collagen are somewhat different, but the present invention is applicable likewise to gelatine and/or gelatine hydrolysate derived from poultry and fish collagen.

Gelatine can be utilized in a wide array of applications depending upon its starting material and method of manufacture. This is because the physical and chemical behavior of gelatine is determined on one hand by a combination of its amino acid content and the resulting spatial structure, and on another hand by a myriad of conditions such as pH, ionic strength and reactions with other molecules. For example, different kinds of gelatines are utilized in diverse applications such as food, photographic, cosmetic, and pharmaceutical.

In the pharmaceutical industry, gelatine is used inter alia in the manufacture of hard and soft capsules. Gelatine capsules provide a convenient and efficient method to orally administer a drug because the capsules disintegrate rapidly upon exposure to the acidic content of the stomach, thus releasing the drug into the body. While gelatine capsules provide a pharmaceutically elegant manner in which to administer a drug, there is, however, a risk that the gelatine capsule may suffer from retardation of disintegration and dissolution resulting from a process known as cross-linking. Cross-linking is believed to occur when carbonyl groups in gelatine, carbonyl-containing fill ingredients in capsules, or decomposition of fill ingredients into carbonyl groups, react with primary amines and other nitrogenous compounds present in gelatine to form cross-links.

Cross-linking, in particular, can have dire consequences on the performance of gelatine capsules upon extended storage and exposure to extremes of heat and humidity. Extensive gelatine cross-linking in capsule formulations may lead to the formation of a very thin, tough and water-insoluble film, usually referred to as a pellicle. The pellicle acts as a rubbery, water-insoluble layer that can restrict, or prevent release of the contents of the capsule.

One widely reported means to prevent cross-linking in gelatine capsules focuses on products that act as carbonyl scavengers, preventing the interaction of carbonyl groups, e.g., aldehyde groups, with the gelatine capsule shell, thus preventing gelatine cross-linking. These methods all generally suggest adding products to the pharmaceutical composition contained in the gelatine capsules. For example, it has been shown that adding the amino acid glycine and citric acid in combination to formulations encapsulated in gelatine hard capsules improved the dissolution profile of the hard capsules (3). Addition of the amino acid glycine alone was proven not to yield satisfactory results. But the addition of carbonyl scavengers such as glycine, and carboxylic acids such as citrate, in the amounts needed to reduce cross-linking in gelatine capsules is significantly cost prohibitive. As such, adding these products to gelatine is not a practical solution to reduce cross-linking in gelatine capsules.

SUMMARY OF THE INVENTION

The present invention provides a practical, cost-effective means to reduce cross-linking in gelatine. Briefly, the invention encompasses a low molecular weight gelatine hydrolysate that, when blended with higher molecular weight gelatine, reduces the gelatine's cross-linking and improves the dissolution properties by increasing the amounts of free glycine, other amino acids, and small peptides in the blended gelatine product. Advantageously, because the gelatine hydrolysate and blended gelatine composition of the invention have reduced cross-linking properties achieved without the addition of products such as glycine as an isolated compound admixed with citric acid, the gelatine may still be marketed as a natural product.

Among the several aspects of the invention, therefore, is a process for producing a gelatine hydrolysate having an average molecular weight of from about 100 to about 2000 Da, preferably about 1500 Da, and an average primary amine content from about $1.0 \times 10^{-3}$ to about $1.0 \times 10^{-2}$ µMol of primary amine per µg of gelatine hydrolysate. The process comprises contacting a gelatine starting material with at least one proteolytic enzyme having endopeptidase activity to form an endopeptidase digested gelatine product. The endopeptidase digested gelatine product is then typically contacted with at least one proteolytic enzyme having exopeptidase activity. Generally, the endopeptidase and exopeptidase proteolytic digestions proceed for a sufficient length of time and are conducted under reaction conditions so as to form the gelatine hydrolysate.

Another aspect of the invention encompasses a process for making a gelatine hydrolysate. The process comprises contacting a gelatine starting material with a series of at least three proteolytic enzymes having endopeptidase activity to form an endopeptidase digested gelatine product. Typically, the three proteolytic enzymes consist of Endopeptidase from *Bacillus subtilis* (e.g. Corolase® 7089), Bromelain (e.g. Enzeco® Bromelain Concentrate), and Papain (e.g. Papain 6000L). The endopeptidase digested gelatine product is then contacted with a series of at least two proteolytic enzymes having exopeptidase activity. Generally, the two proteolytic enzymes consist of Exopeptidase from *Aspergillus oryzae* (e.g. Validase® FPII) and Exopeptidase from *Aspergillus sojae* (e.g. Corolase® LAP).

Yet a further aspect of the invention provides a gelatine hydrolysate. The gelatine hydrolysate will typically have an average molecular weight of from about 100 to about 2000 Da, preferably about 1500 Da and an average primary amine content from about $1.0\times10^{-3}$ to about $1.0\times10^{-2}$ μMol of primary amine per μg of gelatine hydrolysate. In one embodiment, the gelatine hydrolysate is made by a process comprising contacting a gelatine starting material with a series of at least three proteolytic enzymes having endopeptidase activity to form an endopeptidase digested gelatine product. Typically, the three proteolytic enzymes are selected from Endopeptidase from *Bacillus subtilis* (e.g. Corolase® 7089), Bromelain (e.g. Enzeco® Bromelain Concentrate), and Papain (e.g. Papain 6000L). The endopeptidase digested gelatine product is then contacted with a series of at least two proteolytic enzymes having exopeptidase activity. Generally, the two proteolytic enzymes are selected from Exopeptidase from *Aspergillus oryzae* (e.g. Validase® FPII) and Exopeptidase from *Aspergillus sojae* (e.g. Corolase® LAP).

An additional aspect of the invention is directed to a gelatine composition. The composition comprises a gelatine hydrolysate and gelatine. Typically, the composition will comprise from about 1% to about 20% by weight of the gelatine hydrolysate and from about 80% to about 99% by weight of the gelatine.

Other objects and features of the invention will be in part apparent and in part pointed out hereinafter.

DESCRIPTION OF THE PREFERRED EMBODIMENTS

The present invention provides a novel gelatine hydrolysate, a process to make the gelatine hydrolysate and gelatine compositions comprising the gelatine hydrolysate. It has been discovered that blending a low molecular weight gelatine hydrolysate and in particular, the gelatine hydrolysate of the present invention, with gelatine, reduces the gelatine's tendency to cross-link and improves dissolution properties by increasing the amounts of free glycine, other amino acids, and small peptides in the blended gelatine product. Advantageously, the present invention provides a cost effective means to reduce gelatine cross-linking with the benefit of maintaining the original amino acid composition of gelatine and without the need to add non-gelatine derived compounds like citric acid. As such, the gelatine hydrolysate compositions of the present invention can still be marketed as natural products.

I. Process for Making the Gelatine Hydrolysate

One aspect of the present invention encompasses a process to produce a gelatine hydrolysate having an average molecular weight of from about 100 to about 2000 Da, preferably about 1500 Da and an average primary amine content from about $1.0\times10^{-3}$ to about $1.0\times10^{-2}$ μMol of primary amine per μg of gelatine hydrolysate. The process comprises contacting a gelatine starting material with at least one proteolytic enzyme having endopeptidase activity to form an endopeptidase digested gelatine product. The endopeptidase digested gelatine product is then typically contacted with at least one proteolytic enzyme having exopeptidase activity. Generally, the endopeptidase and exopeptidase proteolytic digestions proceed for a sufficient length of time and are conducted under reaction conditions so as to form the gelatine hydrolysate.

The gelatine starting material used in the process of the invention is typically derived from collagen or collagen rich tissue available from several suitable raw materials. Collagen rich tissues include the skin and bones from animals, such as from fish, poultry, pigs or cattle. There are generally two main types of gelatine derived from collagen, Type A and Type B that differ in their method of manufacture. In one embodiment, the gelatine starting material is Type A gelatine. Type A, with an isoionic point of 7 to 10.0, is derived from collagen with exclusively acid pretreatment by methods generally known in the art. In an alternative embodiment, the gelatine starting material is Type B gelatine. Type B, with an isoionic point of 4.8 to 5.8, is the result of an alkaline pretreatment of collagen and is produced by methods generally known in the art.

In another alternative embodiment, the gelatine starting material is a mixture of Type A and Type B. The respective amounts of Type A and Type B gelatine may be greatly varied without detrimental effect on the properties of the gelatine hydrolysate produced.

In principle, any one of Type A and Type B gelatine could be exchanged completely or partially by enzymatically produced gelatine. However, the enzymatic process for manufacturing gelatine is up to present not widely used.

Irrespective of the embodiment, the gelatine starting material will normally contain from about 80% to about 90% by weight protein, from about 0.1% to about 2% by weight mineral salts (corresponding to the ash content) and from about 10% to 15% by weight water.

It is also contemplated that the physical properties of the gelatine starting material can and will vary depending upon the intended use of the gelatine hydrolysate. The gelatine starting material will typically have an average molecular weight of from about 50,000 Da to about 200,000 Da. In a particularly preferred embodiment, the gelatine starting material will have an average molecular weight of less than about 150,000 Da.

In one embodiment, the bloom strength of the gelatine starting material will be from about 50 to about 300, the pH will be from about 3.8 to about 7.5, the isoelectric point will be from about 4.7 to about 9.0, the viscosity will be from about 15 to about 75 mP and the ash will be from about 0.1 to about 2.0%.

In an alternative embodiment when the gelatine starting material is substantially Type A gelatine, the bloom strength will be from about 50 to about 300, the pH will be from about 3.8 to about 5.5, the isoelectric point will be from about 7.0 to about 9.0, the viscosity will be from about 15 to about 75 mP and the ash will be from about 0.1 to about 2.0%.

In an alternative embodiment when the gelatine starting material is substantially Type B gelatine, the bloom strength will be from about 50 to about 300, the pH will be from about 5.0 to about 7.5, the isoelectric point will be from about 4.7 to about 5.4, the viscosity will be from about 20 to about 75 mP and the ash will be from about 0.5 to about 2.0%.

In one preferred embodiment where the gelatine hydrolysate is used in the manufacture of hard capsule pharmaceutical products, the gelatine starting material will have a bloom strength from about 200 to about 300, a viscosity from about 40 to about 60 mP and a pH from about 4.5 to about 6.5. In yet another preferred embodiment where the gelatine hydrolysate is used in the manufacture of soft shell capsule pharmaceutical products, the gelatine starting material will have a bloom strength from about 125 to about 200, a viscosity from about 25 to about 45 mP and a pH from about 4.5 to about 6.5.

In the process of the invention, the gelatine starting material is typically mixed or dissolved in water by a process known as swelling to form a solution comprising from about 10% to about 60% gelatine by weight. In one preferred embodiment, the solution has from about 10% to about 50% gelatine by weight.

In a further preferred embodiment, the solution has from about 20% to about 50% gelatine by weight. In a still more preferred embodiment, the solution has from about 35% to about 40% gelatine by weight.

It is contemplated that gelatines having varying particle sizes may be utilized in the invention as starting material. For example, the gelatine particle size may vary from about 0.1 mm to about 10 mm. In one embodiment, the gelatine particle size may be fine having an average particle size from about 0.1 to about 0.3 mm. In another embodiment, the gelatine particle size may be medium having an average particle size of from about 0.3 to about 0.8 mm. In still another embodiment, the gelatine particle size may be large having an average particle size of approximately greater than about 0.8 mm. Generally speaking, the particle size of the gelatine starting material will impact the amount of time needed for the gelatine to dissolve in solution. During the swelling process, the ability for gelatine to absorb up to ten times its weight in cold water is utilized. Gelatines having a fine particle size swell within a few minutes, gelatines having a medium particle size swell within about 8 to about 12 minutes, and gelatines having a large particle size swell within about an hour. Typically, low concentrated gelatine solutions, solutions having for example, from about 10% to about 20% by weight gelatine, can be prepared using all particle sizes. For highly concentrated solutions, solutions having for example, from about 30% to about 35% gelatine by weight, coarse particles are typically used because they tend not to aggregate and produce fewer air bubbles when being processed.

After the gelatine has been brought in solution through the swelling process and typically prior to the addition of the proteolytic enzymes, the pH, temperature and Redox State of the solution is typically adjusted to take care of minor amounts of residual peroxide present in the gelatine from its manufacturing process so as to optimize the hydrolysis reaction, and in particular, to ensure that the cysteine-containing proteolytic enzymes utilized in the hydrolysis reaction function near their optimum activity level. The pH of the gelatine solution is adjusted and maintained at from about 5 to about 7. In a particularly preferred embodiment, the pH of the gelatine solution is adjusted and maintained at from about 6.0 to about 6.5. At this pH, proteolytic enzymes detailed below are near their optimum activity level. The pH of the gelatine solution may be adjusted and monitored according to methods generally known in the art. For example, to decrease the pH of the gelatine solution an acid, such as hydrochloric acid, is typically added. Alternatively, to increase the pH of the gelatine solution a base, such as sodium hydroxide, is typically added. The temperature of the gelatine solution is preferably adjusted and maintained from about 40° C. to about 65° C. during the hydrolysis reaction in accordance with methods known in the art. In a particularly preferred embodiment, the temperature of the gelatine solution is adjusted and maintained from about 50° C. to about 60° C. during the hydrolysis reaction. In general, temperatures above this range may deactivate proteolytic enzymes, while temperatures below this range tend to slow the activity of the proteolytic enzymes. Depending upon the proteolytic enzyme used in the hydrolysis reaction, the Redox State of the gelatine solution typically should be adjusted and maintained as neutral to slightly on the reducing side. High levels of oxidants tend to inactivate some of the cysteine-containing proteolytic enzymes used in the hydrolysis reaction, while low levels of reductants may serve to keep some of the proteolytic enzymes, such as papain, active until they are deactivated.

In general, the hydrolysis reaction is conducted by adding proteolytic enzymes to the gelatine solution. Several proteolytic enzymes are suitable for use in the process of the invention. In a preferred embodiment, the proteolytic enzymes will be food grade enzymes having endopeptidase or exopeptidase activity at a pH from about 5 to about 7 and at a temperature from about 40° C. to about 65° C. In a particularly preferred embodiment, the proteolytic enzymes will be food grade enzymes having endopeptidase or exopeptidase activity at a pH from about 6 to about 6.5 and at a temperature from about 50° C. to about 60° C.

In one embodiment, the endopeptidase will be a food grade serine proteinase belonging to EC 3.4.21. In one alternative of this embodiment, the serine proteinase is a chymotrypsin proteinase. In a further alternative of this embodiment, the serine proteinase is a subtilisin proteinase. In another embodiment, the endopeptidase will be a food grade cysteine proteinase belonging to EC 3.4.22. In yet another embodiment, the endopeptidase will be a food grade aspartic proteinase belonging to EC 3.4.23. In an additional embodiment, the endopeptidase will be a food grade metalloproteinase belonging to EC 3.4.24. Exemplary non-limiting examples of food grade endopeptidases that may be utilized in the process of the invention include Validase® AFP, Validase® FP 500, Alkaline Protease Concentrate, Validase® TSP, Enzeco® Bromelain Concentrate, Corolase® 7089, Papain 600L and Validase® Papain Concentrate Sulfite Free.

In a further embodiment, the exopeptidase will be a food grade amino peptidase belonging to EC 3.4.11. In another embodiment, the exopeptidase will be a food grade dipeptidase belonging to EC 3.4.13. In still another embodiment, the exopeptidase will be a food grade peptidyldi or tripeptidase belonging to EC 3.4.14. In yet another embodiment, the exopeptidase will be a food grade peptidyidipeptidase belonging to EC 3.4.15. In an additional embodiment, the exopeptidase will be a food grade serine-type carboxy peptidase belonging to EC 3.4.16. In yet another embodiment, the exopeptidase will be a food grade metallo carboxy peptidase belonging to EC 3.4.17. In an additional embodiment, the exopeptidase will be a food grade cysteine-type carboxy peptidase belonging to EC 3.4.18. In still an another embodiment, the exopeptidase will be a food grade omega peptidase belonging to EC 3.4.19. An exemplary example of a food grade exopeptidase that may be utilized in the process of the invention includes Validase® FP II or Corolase LAP®.

Another example of a food grade hydrolytic enzyme that may be used in the process of the invention is Validase® FP Concentrate. Examples of other suitable proteolytic food grade enzymes are shown in Table A.

TABLE A

| Proteolytic Enzyme | Source |
| --- | --- |
| Alcalase ® | Novoenzymes |
| Flavourzyme ® | Novoenzymes |
| Protamex ® | Novoenzymes |
| Fungal Protease Concentrate | Genencor Enzymes |
| Fungal Protease 500,000 | Genencor Enzymes |
| Protex ™ 6L | Genencor Enzymes |
| Multifect ® P-3000 | Genencor Enzymes |
| Multifect ® Neutral | Genencor Enzymes |
| Corolase ® TS | AB Enzymes |
| Corolase ® PP | AB Enzymes |
| Enzeco ® Chymotrypsin 1:1 | Enzeco Development Corp. |
| Enzeco ® Trypsin 1200 | Enzeco Development Corp. |
| Enzeco ® Trypsin 6 | Enzeco Development Corp. |
| Enzeco ® Ficin | Enzeco Development Corp. |
| Enzeco ® Fungal Acid Protease | Enzeco Development Corp. |
| Enzeco ® Fungal Protease 100 | Enzeco Development Corp. |
| Enzeco ® Fungal Protease 180 | Enzeco Development Corp. |
| Enzeco ® Fungal Protease 400 | Enzeco Development Corp. |
| Enzeco ® Exo-Protease | Enzeco Development Corp. |
| Enzeco ® Neutral Bacterial Protease 2X | Enzeco Development Corp. |
| Enzeco ® Neutral Bacterial Protease 160K | Enzeco Development Corp. |
| Enzeco ® Glutaminase ADK | Enzeco Development Corp. |
| Enzeco ® Alkaline Protease L-600 FG | Enzeco Development Corp. |
| Enzeco ® Alkaline Protease 44MG | Enzeco Development Corp. |
| Enzeco ® Alkaline Protease 66L | Enzeco Development Corp. |
| HT-Proteolytic | Deerland Enzymes |
| BC Pepsin 3000_P389P-3 | Biocatalysts |
| BC Pepsin 10000_P389P-10 | Biocatalysts |
| Promod ™ 144MG | Biocatalysts |
| Promod ™ 144L | Biocatalysts |
| Promod ™ 144P | Biocatalysts |
| Promod ™ 192P | Biocatalysts |
| Promod ™ 194P | Biocatalysts |
| Promod ™ 278P | Biocatalysts |
| Promod ™ 279P | Biocatalysts |
| Promod ™ 298L | Biocatalysts |
| Promod ™ 439L | Biocatalysts |
| Promod ™ 648L | Biocatalysts |
| Promod ™ 671L | Biocatalysts |

Typically, combinations of endopeptidases and exopeptidases will be used to catalyze the hydrolysis reaction. The proteolytic enzymes are preferably selected by considering the protease activity of the enzymes and selecting enzymes that will maximize the cleaving of peptide bonds in the gelatine starting material. In a preferred embodiment, enzymes with preferential endopeptidase activity are added to the gelatine solution first to form an endopeptidase digested gelatine product. The endopeptidase digested gelatine product is then contacted with enzymes having preferential exopeptidase activity without deactivating the endopeptidase(s). It is also contemplated that in certain embodiments enzymes having exopeptidase activity may be added before or at the same time as enzymes having endopeptidase activity.

In one preferred embodiment, the endopeptidase is selected from the group consisting of Corolase® 7089, Validase® AFP, Validase® FP 500, Alkaline Protease Concentrate, Validase® TSP, Enzeco® Bromelain Concentrate, Papain 6000L and Validase® Papain Concentrate Sulfite Free; and the exopeptidase is Validase® FP II or Corolase® LAP. In yet another embodiment, the endopeptidase is selected from the group consisting of Corolase® 7089, Enzeco® Bromelain Concentrate, and Papain 6000L; and the exopeptidase is selected from the group consisting of Validase® FPII and Corolase® LAP. In a preferred embodiment, each proteolytic enzyme is sequentially added to the gelatine starting material in the following order: Corolase® 7089, Enzeco® Bromelain Concentrate, Papain 6000L, Validase® FPII and Corolase® LAP. In one alternative of this embodiment, each proteolytic enzyme digests the gelatine starting material for approximately 0.5 to about 2 hours before addition of the subsequent proteolytic enzyme.

The amount of proteolytic enzyme added to the hydrolysis reaction can and will vary depending upon the desired degree of gelatine hydrolysis and the duration of the hydrolysis reaction. In general, about 0.025% to about 0.15% (w/w) of the proteolytic enzyme having endopeptidase activity is added and from about 0.025% to about 0.15% (w/w) of the proteolytic enzyme having exopeptidase activity is added for a hydrolysis reaction lasting for a duration of from about 5 hours to about 24 hours. In a preferred embodiment, about 0.05% to about 0.15% (w/w) of Corolase® 7089, about 0.025% to about 0.075% (w/w) of Enzeco® Bromelain Concentrate, about 0.05% to about 0.15% (w/w) of Papain 6000L, about 0.025% to about 0.075% (w/w) of Validase® FPII, and about 0.05% to about 0.15% (w/w) of Corolase® LAP are added to the gelatine starting material.

The hydrolysis reaction will typically proceed for up to approximately 24 hours. Typically, after about 24 hours the quality of the gelatine hydrolysate, in terms of color and smell, will begin to noticeably diminish. In another embodiment, the hydrolysis reaction will proceed from about 1 hour to about 24 hours. In yet another embodiment, the hydrolysis reaction will proceed from about 3 hours to about 15 hours. In a still more preferred embodiment, the hydrolysis reaction will proceed from about 5 hours to about 12 hours. Within this time period, highly economic process conditions and constant quality of the gelatine hydrolysate are easily achievable. To end the hydrolysis reaction, the hydrolyzed gelatine solution may be heated to approximately 90° C. to deactivate the proteolytic enzymes. An additional step to deactivate the cysteine proteases may be required. If so required, the addition of hydrogen peroxide or other oxidizing agent may be added, generally not to exceed 1000 ppm. The gelatine hydrolysate may then be purified from the hydrolysis solution by any means generally known in the art, e.g. microfiltration.

Typically, the degree of hydrolysis (DH) of the starting gelatine material in the process of the invention is greater than about 13%. In certain embodiments, the DH is from about 10% to about 20%. In other embodiments, the DH is from about 20% to about 30%. In another embodiment, the DH is from about 30% to about 40%. In yet another embodiment, the DH is from about 40% to about 50%. In still another embodiment, the DH is from about 50% to about 60%. In an additional embodiment, the DH is from about 60% to about 70%. In yet a further embodiment, the DH is from about 70% to about 80%. In still another embodiment, the DH is from about 80% to about 90%. In still another embodiment, the DH is greater than about 90%. The DH is the percentage of the total number of peptide bonds in the gelatine starting material that have been hydrolyzed by proteolytic enzymes. The DH may be calculated by methods generally known in the art, such as according to the Adler-Nissen method (19).

It has been observed that gelatine hydrolysates with a lower average molecular weight are more effective in preventing the cross-linking process. As a consequence, the amount of hydrolysate in the gelatine formulation may be reduced which optimizes costs.

II. Gelatine Hydrolysate

Yet another aspect of the invention encompasses a gelatine hydrolysate made by the process of the invention. Generally speaking, the gelatine hydrolysate, compared to the gelatine starting material, will comprise a mixture of peptide of different lengths having an increase in the amounts of free glycine, other amino acids, and small peptides. The gelatine hydrolysate will also have a lower average molecular weight and higher primary amine content compared to the gelatine starting material.

The gelatine hydrolysate will typically have an average molecular weight of at least about 100 Da. In other embodiments, the gelatine hydrolysate will typically have an average molecular weight not exceeding about 2000 Da. In some embodiments, the gelatine hydrolysate will have an average molecular weight of from about 100 Da to about 2,000 Da. In other embodiments, the gelatine hydrolysate will have an average molecular weight of about 700 Da to about 1800 Da. In another embodiment, the gelatine hydrolysate will have an average molecular weight of about 700 Da to about 1500 Da. In still other embodiments, the gelatine hydrolysate will have an average molecular weight of from about 800 Da to about 1200 Da.

The average molecular weight is the weight of a gelatine hydrolysate as measured by electro-spray ionization liquid chromatography mass spectrometry (ESI-LC/MS). For example, a gelatine hydrolysate having an average molecular weight of approximately 1200 Da may have a molecular weight range from about 75 Da to 8000 Da.

In general, the gelatine hydrolysate will have an average primary amine content of not less than about $1.0 \times 10^{-3}$ μMol of primary amine per μg of gelatine hydrolysate. In another embodiment, the gelatine hydrolysate will have an average primary amine content of not less than about $1.5 \times 10^{-3}$ μMol of primary amine per μg of gelatine hydrolysate. In still another embodiment, the gelatine hydrolysate will have an average primary amine content of not less than about $2.0 \times 10^{-3}$ μMol of primary amine per μg of gelatine hydrolysate. In an additional embodiment, the gelatine hydrolysate will have an average primary amine content of from about from about $1.0 \times 10^{-3}$ to about $1.0 \times 10^{-2}$ μMol of primary amine per μg of gelatine hydrolysate. The primary amine content of the gelatine hydrolysate is measured through derivatization and subsequent UV absorption (6-8) as illustrated in the Examples.

The gelatine hydrolysate of the present invention comprises polypeptides typically of up to about 75 amino acids in length, preferably up to 50 amino acids in length. In one embodiment, the average polypeptide comprising the gelatine hydrolysate is from about 6 to about 18 amino acids in length. In another embodiment, the average polypeptide contained in the gelatine hydrolysate of the present invention is from about 9 to about 20 amino acids in length. The length of a polypeptide chain may be determined indirectly by size-exclusion chromatography/high performance liquid chromatography (SEC/HPLC).

In one embodiment, the gelatine hydrolysate will have an average molecular weight from about 100 Da to about 2,000 Da, an average primary amine content from about $1.0 \times 10^{-3}$ to about $1.0 \times 10^{-2}$ μMol of primary amine per μg of gelatine hydrolysate, and an average polypeptide length of up to about 20 amino acids. In still another embodiment, the gelatine hydrolysate will have an average molecular weight from about 700 Da to about 1500 Da, an average primary amine content from about $1.0 \times 10^{-3}$ to about $2.0 \times 10^{-3}$ μMol of primary amine per μg of gelatine hydrolysate, and an average polypeptide length of up to about 18 amino acids. In another embodiment, the gelatine hydrolysate will have an average molecular weight from about 800 Da to about 1200 Da, an average primary amine content from about $1.0 \times 10^{-3}$ to about $2.0 \times 10^{-3}$ μMol of primary amine per μg of gelatine hydrolysate, and an average polypeptide length of from about 4 to about 18 amino acids.

III. Gelatine Compositions

Another aspect of the invention encompasses a gelatine composition comprising a low molecular weight gelatine hydrolysate and gelatine. Surprisingly it has been found that when a low molecular weight gelatine hydrolysate is blended with higher molecular weight gelatine, it reduces the gelatine's cross-linking and improves the dissolution properties by increasing the amounts of free glycine, other amino acids, and small peptides in the blended gelatine product, as shown in the Examples.

A number of different gelatine hydrolysates are suitable for use in the gelatine composition. In one embodiment, the gelatine hydrolysate will be an enzymatically-digested hydrolysate. By way of non-limiting example, the gelatine hydrolysate of the present invention is produced via an enzymatic hydrolysis procedure, as detailed above. In another embodiment, the gelatine hydrolysate will be an acid digested hydrolysate. For example, acid hydrolysis may be conducted by digesting a gelatine starting material with approximately 6 N hydrochloric acid for about 24 hours at a reaction temperature of approximately 110° C. In yet another embodiment, the gelatine hydrolysate will be a base digested hydrolysate. By way of non-limiting example, base hydrolysis may be conducted by digesting a gelatine starting material with a strong base, such as sodium hydroxide. Acid and base hydrolysis will typically result in a hydrolysate having free amino acids. In each embodiment (i.e., enzymatic, acid and base hydrolysis), suitable gelatine starting materials are detailed in section I above, which delineates structural and functional properties for gelatine starting materials to be used in the process of the invention.

Typically, gelatine hydrolysates will have a low molecular weight. In one embodiment, the average molecular weight will be from about 400 Da to about 2000 Da. In another embodiment, the gelatine hydrolysate will have an average molecular weight from about 700 Da to about 1500 Da. In addition, the gelatine hydrolysate will also have an average primary amine content ranging from about $1.0 \times 10^{-3}$ to about $1.0 \times 10^{-2}$ μMol of primary amine per μg of gelatine hydrolysate.

In another embodiment, the average primary amine content may range from about $1.0 \times 10^{-3}$ to about $2.0 \times 10^{-3}$ μMol of primary amine per μg of gelatine hydrolysate.

In still another embodiment, the average primary amine content may range from about $2.0 \times 10^{-3}$ to about $4.0 \times 10^{-3}$ μMol of primary amine per μg of gelatine hydrolysate. In still a further embodiment, the average primary amine content may range from about $4.0 \times 10^{-3}$ to about $6.0 \times 10^{-3}$ μMol of primary amine per μg of gelatine hydrolysate. In yet an additional embodiment, the average primary amine content may range from about $6.0 \times 10^{-3}$ to about $1.0 \times 10^{-2}$. Mol of primary amine per μg of gelatine hydrolysate.

The gelatine hydrolysate will also generally have an average polypeptide chain length from about 4 to about 50 amino acids. In one embodiment, the average polypeptide comprising the gelatine hydrolysate is up to about 30 amino acids in length. In another embodiment, the average polypeptide comprising the gelatine hydrolysate is from about 9 to about 20 amino acids in length. The average molecular weight, average primary amine content and average polypeptide chain length are determined as detailed in section II.

In a preferred embodiment, the gelatine hydrolysate used in the composition will be the hydrolysate of the present invention as detailed in section II. Examples of other exemplary gelatine hydrolysates that may be used in the composition are delineated in Table B. Mixtures of the afore-described gelatine hydrolysates may also be used.

TABLE B

| GELITA Gelatine Hydrolysates | GELITA Location Where Manufactured | Raw Material | Molecular Weight | Viscosity |
|---|---|---|---|---|
| Type A-2 | Europe | porcine skin | 2.5-4.5 kDa | 30-60 mP (25%@20° C.) |
| Type A-3 | Chicago | porcine skin | 2.5-3.0 kDa | 40-60 mP (25%@25° C.) |
| Type BH-1 | Europe | bovine hide | 2.0-4.0 kDa | 32-47 mP (20%@25° C.) |
| Type BH-2 | Europe | bovine hide | 2.0-4.0 kDa | 32-47 mP (20%@25° C.) |
| Type A-5 | Sioux City | porcine skin | 2.0-4.0 kDa | 42-71 mP (20%@25° C.) |
| Type BB-1 | Sioux City | bovine bone | 2.0-4.0 kDa | 42-90 mP (20%@25° C.) |
| Type BB-2 | Sioux City | bovine bone | 2.0-4.0 kDa | 20-40 mP (20%@25° C.) |
| Type BBH-1 | Europe | bovine bone/hide | 2.0-4.0 kDa | 32-50 mP (20%@25° C.) |
| Type BB-3 | Chicago | bovine bone | 2.0-4.0 kDa | 30-50 mP (20%@25° C.) |
| Type BB-4 | Chicago | bovine bone | 2.0-4.0 kDa | 30-50 mP (20%@25° C.) |
| Type BB-5 | Chicago | bovine bone | 2.0-4.0 kDa | 42-90 mP (20%@25° C.) |
| Type BB-6 | Chicago | bovine bone | 2.0-4.0 kDa | 42-90 mP (20%@25° C.) |
| Type A-6 | Chicago | porcine skin | 2.0-4.0 kDa | 30-60 mP (20%@25° C.) |
| Type A-7 | Chicago | porcine skin | 2.0-4.0 kDa | 30-60 mP (20%@25° C.) |
| Type A-8 | South America | porcine skin | 2.0-4.0 kDa | 30-60 mP (20%@25° C.) |
| Type BH-3 | South America | bovine hide | 2.0-4.0 kDa | 30-60 mP (20%@25° C.) |

The gelatine hydrolysate may be blended with several types of gelatine having a broad range of physical and functional properties. The choice of a particular gelatine can and will vary greatly depending upon the intended use of the gelatine composition. Generally speaking, irrespective of the embodiment or intended use, the gelatine is typically derived from collagen or collagen rich tissue available from several suitable raw materials such as from the skin and bones of animals. In one embodiment, the gelatine is Type A gelatine. In another embodiment, the gelatine is Type B gelatine. In still another embodiment, the gelatine is a mixture of Type A and Type B gelatine. Again, gelatine prepared in an enzymatic process may be used to substitute Type A and/or Type B gelatine.

The gelatine, irrespective of the embodiment, will preferably contain from about 80% to about 90% by weight protein, from about 0.1% to about 2% by weight mineral salts (ash content) and from about 10% to 15% by weight water.

The gelatine will typically have a high average molecular weight. In one embodiment, the gelatine will have an average molecular weight of greater than about 200,000 Da. In another embodiment, the gelatine will have an average molecular weight greater than about 150,000 Da. In still another embodiment, the gelatine will have an average molecular weight from about 100,000 Da to about 200,000 Da.

In one embodiment, the bloom strength of the gelatine will be from about 50 to about 300, the pH will be from about 3.8 to about 7.5, the isoelectric point will be from about 4.7 to about 9.0, the viscosity will be from about 15 to about 75 mP and the ash will be from about 0.1 to about 2.0%.

In an alternative embodiment when the gelatine is substantially Type A gelatine, the bloom strength will be from about 50 to about 300, the pH will be from about 3.8 to about 5.5, the isoelectric point will be from about 7.0 to about 10.0, the viscosity will be from about 15 to about 75 mP and the ash will be from about 0.1 to about 2.0%.

In an alternative embodiment when the gelatine is substantially Type B gelatine, the bloom strength will be from about 50 to about 300, the pH will be from about 5.0 to about 7.5, the isoelectric point will be from about 4.8 to about 5.8, the viscosity will be from about 20 to about 75 mP and the ash will be from about 0.5 to about 2.0%.

In one preferred embodiment where the gelatine composition is used in the manufacture of hard capsule pharmaceutical products, the gelatine will have a bloom strength from about 200 to about 300, a viscosity from about 40 to about 60 mP and a pH from about 4.5 to about 6.5.

In yet another preferred embodiment where the gelatine composition is used in the manufacture of soft shell capsule pharmaceutical products, the gelatine will have a bloom strength from about 125 to about 200, a viscosity from about 25 to about 45 mP and a pH from about 4.5 to about 6.5.

The gelatine composition of the invention will generally comprise from about 1% to about 20% by weight of the gelatine hydrolysate and from about 80% to about 99% by weight of the gelatine. In another embodiment, the gelatine composition will comprise from about 1% to about 5% by weight of the gelatine hydrolysate and from about 95% to about 99% by weight of the gelatine. In yet another embodiment, the gelatine composition will comprise from about 5% to about 10% by weight of the gelatine hydrolysate and from about 90% to about 95% by weight of the gelatine. In another embodiment, the gelatine composition will comprise from about 10% to about 15% by weight of the gelatine hydrolysate and from about 85% to about 90% by weight of the gelatine.

In an additional embodiment, the gelatine composition will comprise from about 15% to about 20% by weight of the gelatine hydrolysate and from about 80% to about 85% by weight of the gelatine. In a typical embodiment, the gelatine composition will comprise a ratio of gelatine hydrolysate to gelatine from about 1:4 to about 1:99 (w/w).

In a preferred embodiment, the gelatine composition will comprise the gelatine hydrolysate of the present invention and a higher molecular weight pharmaceutical grade gelatine. In one embodiment, the gelatine composition will comprise from about 5% to about 10% by weight of the gelatine hydrolysate and from about 90% to about 95% by weight of the pharmaceutical grade gelatine. In another embodiment, the gelatine composition will comprise from about 10% to about 15% by weight of the gelatine hydrolysate and from about 85% to about 90% by weight of the pharmaceutical grade gelatine.

Advantageously, gelatine compositions of the present invention and of this embodiment typically have reduced cross-linking as measured by the vortex hardening test and viscosity test. Gelatine compositions of this embodiment typically have a vortex hardening time of about 200 to about 300 seconds. In another embodiment, the vortex hardening time is greater than about 300 seconds. The procedure for determining the vortex hardening time is described in the Examples. Gelatine compositions of this embodiment typically also have an average initial viscosity of from about 10 to about 15 cP and after the addition of less than about 0.5% by weight of [2-(4-dimethyl-carbamoyl-pyridino)-ethane-1-sulfonate] (OB1207® of H.W. Sands Corporation) to the gelatine composition for about two hours at a reaction temperature of about 60° C., the gelatine composition has an average viscosity of from about 15 to about 50 cP. The procedure for measuring viscosity is described in the examples.

In one embodiment, glycine as a separate compound may be added to the gelatine composition of the invention. The glycine may be added to the gelatine composition in an amount of from about 0.5% to about 5% by weight. In a more typical embodiment, the amount of glycine will be from about 1.5% to about 2.5% by weight. In yet another embodiment, citric acid may be added to the gelatine composition. The citric acid may be added in an amount of from about 0.5% to about 5% by weight. In a more typical embodiment, citric acid is added to the gelatine composition in an amount of from about 0.5% to about 1.5%.

The gelatine composition of the invention may be employed in several applications including as a food ingredient, as a cosmetic ingredient and as a photographic ingredient. Because of the gelatine composition's reduced tendency to cross-link and improved dissolution properties, in a preferred embodiment, the gelatine composition is used in the manufacture of pharmaceutical products.

In one preferred embodiment, the gelatine composition is used in the manufacture of hard gelatine capsules. As detailed above, when the gelatine composition is used in the manufacture of hard capsule pharmaceutical products, the gelatine will have a bloom strength from about 200 to about 300, a viscosity from about 40 to about 60 mP and a pH from about 4.5 to about 6.5. A typical hard capsule formulation will comprise approximately 30% by weight of the gelatine composition of the invention, approximately 65% by weight water, approximately 5% by weight of a suitable dye, and will contain a pigment as needed. The hard gelatine capsules may be made according to any method generally known in the art.

In yet another preferred embodiment, the gelatine composition is used in the manufacture of soft capsule gelatine. As detailed above, when the gelatine composition is used in the manufacture of soft shell capsule pharmaceutical products, the gelatine will have a bloom strength from about 125 to about 200, a viscosity from about 25 to about 45 mP and a pH from about 4.5 to about 6.5. A typical soft capsule gelatine formulation will comprise from about 40% to about 45% by weight of the gelatine composition of the invention, from about 15% to about 35% by weight of plasticizer and from about 20% to about 45% by weight of water. The soft gelatine capsules may be made according to any method generally known in the art. Typical examples for plasticizers are glycerol (usually used in the form of a 85 weight % aqueous solution) and sorbitol (usually used in the form of a 70 weight % aqueous solution) and mixtures thereof.

All publications, patents, patent applications and other references cited in this application are herein incorporated by reference in their entirety as if each individual publication, patent, patent application or other reference were specifically and individually indicated to be incorporated by reference.

Definitions

"Amphoteric" is a substance that can be both cationic and anionic in character, such as a protein.

"Bloom value" is the degree of firmness of a gel measured in grams. The bloom value is the force required for a punch of defined form and dimension to penetrate 4 mm deep into the surface of a 6.7% by weight gelatine solution. The bloom values of commercially available gelatines are between 80 and 280.

"Bone chip" is chipped, degreased and dried bone from which, subsequent to demineralization (see maceration), gelatine is produced.

"Cross-linking" refers to the mechanism by which, e.g., a pellicle is formed on a pharmaceutical soft capsule. Typically, cross-linking decreases the dissolution properties of the capsule.

"Da" is an abbreviation for Dalton.

"EC" is an abbreviation for Enzyme Classification. It is typically used as a prefix in the numerical designation of an enzyme.

"Endopeptidase" is an enzyme typically belonging within subclass EC 3.4, peptide hydrolases, that hydrolyses nonterminal peptide linkages in oligopeptides or polypeptides and comprising any enzyme subclasses EC 3.4.21-99.

"Exopeptidase" is an enzyme of a group of peptide hydrolases within subclass EC 3.4 that catalyzes the hydrolysis of peptide bonds adjacent to the terminal amino or carboxyl group of an oligopeptide or polypeptide. The group typically encompasses enzyme subclasses 3.4.11-3.4.19.

"Food Grade Enzyme" is an enzyme that is typically free of genetically modified organisms and is safe when consumed by an organism, such as a human being. Typically, the enzyme and the product from which the enzyme may be derived are produced in accordance with applicable FDA guidelines.

"Hard capsules" are hollow capsules of various sizes made of pure gelatine with or without the addition of dye. They comprise an upper and lower part; these are joined together once filling is completed.

"Instant gelatine" is powder gelatine capable of swelling in cold water.

"Microgel" is considered to be gelatine with a molecular weight greater than 300,000 Da.

"Scleroproteins" are those proteins providing a support function within the body. They are insoluble in water and possess a fibrous structure. These proteins include e.g. keratin that occurs in hair and nails, the elastins and the collagens that occur in support and connective tissue, skin, bone and cartilage.

"Soft capsules" are elastic capsule made of gelatine for filling with active ingredient/excipient mixture. They can be produced with different wall thicknesses and either with or without a seam.

"Split" is a gelatine raw material; mid-layer of the connective tissue of cattle hide.

"Triple helix" is a basic structure of collagen consisting of 3 protein chains. These often possess somewhat different amino acid sequences.

"Type A gelatine" is acid digested gelatine.

"Type B gelatine" is alkali (basic) digested gelatine.

"Type LBSH" is a limed-bone hydrolysate of the present invention produced by proteolytic digestion of gelatine.

"Type LHSH" is a limed-hide hydrolysate of the present invention produced by proteolytic digestion of gelatine.

As various changes could be made in the above compounds, products and methods without departing from the scope of the invention, it is intended that all matter contained in the above description and in the examples given below, shall be interpreted as illustrative and not in a limiting sense.

addition, the solution was left to react for 30 minutes before repeating the peroxide measurement. Fermcolase® 1000F additions were repeated until the peroxide level approached zero.

Corolase® 7089 (AB Enzymes) was added to the solution in the amount of 0.1% w/w. Near the end of the 1-hour reaction time and before the addition of the next enzyme, a small sample was taken and the molecular weight was analyzed. This process was repeated for each of the enzyme additions. After a 1-hour reaction time, 0.05% w/w of Enzeco® Bromelain Concentrate (Enzyme Development Corp.) was added and the solution was left to react for an additional hour. Liquid Papain 6000L (Valley Research) was then added 0.1% w/w. After 1 hour, 0.05% w/w of Validase® FPII (Valley Research) was added to the solution and was reacted for another hour. The final enzyme addition was 0.1% w/w of Corolase® LAP (AB Enzymes). After 1 hour, the solution was heated to 90° C. to deactivate the remaining functional enzymes. In some instances, an additional 30-40 ppm of hydrogen peroxide was added to be certain the Papain 6000L was deactivated. No proof of enzymatic activity after heat deactivation was seen. A summary listing the details of the five enzymes used during hydrolysis is given in Table 1.

TABLE 1

| Name | Enzyme Type | Source | optimum ranges | Supplier |
| --- | --- | --- | --- | --- |
| Corolase ® 7089 | Protease endopeptidase | Microbial *bacillus subtilis* | <60° C. pH 5-7.5 | AB Enzymes |
| Enzeco ® Bromelain Concentrate | Protease endopeptidase | Plant Pineapple | 50-60° C. @ pH 5.0 3.0-9.0 | Enzyme Development Corp. |
| Papain 6000 L | Protease hydrolase endopeptidase | Plant Papaya | 65-80° C. pH 5.0-7.0 | Valley Research |
| Validase ® FPII | Protease hydrolase exopeptidase | Microbial Fungal *Aspergillus oryzae* | 50-60° C. pH 5.0-8.0 | Valley Research |
| Corolase ® LAP | Protease Pure exopeptidase | Microbial *Aspergillus sojae* | <70° C. pH 6.0-9.0 | AB Enzymes |

EXAMPLES

The following examples illustrate the invention.

Example 1

The gelatine hydrolysate of the invention may be made according to the following process. A solution containing 34% by weight gelatine (limed-bone gelatine Type B, Bloom=100) was made by adding 1.94 kg of water to 1.0 kg of de-ionized processed gelatine. The gelatine was left to hydrate for 1 hour and then placed into a 55° C. water bath to dissolve. Once completely dissolved, the pH of the gelatine solution was adjusted to 6.0-6.5 with aqueous sodium hydroxide. Calcium Chloride was added to the gelatine solution in the amount of 0.0370% w/w with the amount of gelatine in solution (CDG—Commercial Dry Gelatine (having a moisture content of about 10% by weight), all additions in this procedure were based on this amount). An aliquot was taken and was diluted to 5% by weight in order to test the Redox State of the solution. Peroxide testing strips (EM Science) were used to quickly measure the amount of peroxide. If peroxide was present, Fermcolase® 1000F (Genencor International Inc.) was added in 0.5 ml increments. After each The gelatine hydrolysate obtained in this example was used as Type LHSH hydrolysate in the following examples. The average molecular weight was determined to be about 1500 Da.

Example 2

The following procedure was used to quantify the degree of reduction in cross-linking for various gelatine compositions. In the control experiments, 10.0±0.1 g of a gelatine was added to a 250 ml beaker, to which was added 90.0±0.5 g of de-ionized water. A watch glass was placed on the beaker and the gelatine was allowed to swell for 30-60 minutes. The swelled gelatine was placed into a 60±0.1° C. water bath for 15-30 minutes or until all of the gelatine was dissolved. A magnetic stir bar was placed into the gelatine solution and the pH was adjusted upon a stir plate with dilute NaOH or $H_2SO_4$ to a pH of 7.00±0.05 after which the magnetic stir bar was removed. The solution was placed into a water 40±0.1° C. water bath for 15-60 minutes to cool. A digital stirring motor (Heidolph Brinkman 2102) equipped with a 4-blade mixer was used to create vortex at 750±10 RPM. Immediately, 20±0.5 ml of a pH 7 phosphate buffered 10% formalin solution (Fisher Scientific) was added. The vortex hardening time was recorded (in seconds) as the time when the cross-linked gelatine solution collapsed upon the shaft of the 4-blade mixer.

In experiments involving gelatine compositions containing additives, a percentage of the gelatine was substituted with the desired additive (e.g., a 10% hydrolysate added sample contained 9.0 g of gelatine and 1.0 g of hydrolysate). The gelatines exhibiting a longer vortex hardening time are believed to have reduced tendencies towards formaldehyde-induced cross-linking.

Table 3 shows the vortex hardening time of several limed-hide gelatines in relation to different properties of molecular weight. No conclusive trends could be deduced with the exceptions of a possible correlation of an increased percentage of microgel and viscosity with increased cross-linking and a subsequent reduction in the vortex hardening time.

TABLE 3

| Sample | Vortex Hardening (sec) | Bloom/vis (mP) | MW (Da) | MN (DA) | MZ (DA) | MZ + 1 (DA) | Poly-dispersity | % Microgel |
|---|---|---|---|---|---|---|---|---|
| LH-1 | 8.30 | 260/45 | 213,904 | 52,949 | 600,246 | 851,367 | 4.0398 | 17.41 |
| LH-2 | 8.70 | 229/44 | 225,257 | 50,655 | 629,993 | 880,268 | 4.446 | 18.76 |
| LH-3 | 8.99 | 264/48 | 225,013 | 61,969 | 592,328 | 847,234 | 3.6311 | 18.80 |
| LH-4 | 9.33 | 240/33 | 206,317 | 46,151 | 620,740 | 887,725 | 4.4705 | 16.46 |
| LH-5 | 10.85 | 260/52 | 232,321 | 63,612 | 600,657 | 852,871 | 3.6522 | 18.58 |
| LH-6 | 34.18 | 247/48 | 232,608 | 63,148 | 599,777 | 852,031 | 3.6836 | 17.73 |
| LH-7 | 47.31 | 263/42 | 232,384 | 55,568 | 635,932 | 888,496 | 4.1827 | 20.00 |
| LH-8 | 55.49 | 276/46 | 247,005 | 60,234 | 653,816 | 897,853 | 4.1157 | 22.51 |
| LH-9 | 186.51 | 151/40 | 184,474 | 45,503 | 526,119 | 780,369 | 4.0541 | 12.76 |
| LH-10 | 208.14 | 239/36 | 202,601 | 49,094 | 579,370 | 826,045 | 4.1268 | 16.28 |
| LH-11 | 315.30 | 222/32 | 175,773 | 45,076 | 520,956 | 779,246 | 3.8232 | 12.363 |

As shown in Table 2, the vortex hardening test confirms the previous findings that the combination of glycine and citric acid can reduce the amount of gelatine cross-linking. More importantly, the addition of glycine alone has a dramatic effect on the vortex hardening time of this particular limed-bone gelatine sample. The addition of citrate did not reduce cross-linking. Curiously, the addition of 1.5% citrate promoted cross-linking in this particular sample. These results may serve to bolster the position of glycine's role as an aldehyde scavenger in this model system. The detrimental effects on cross-linking experienced by one of the samples containing only citrate cannot be readily explained.

The vortex hardening test is used herein as an analytical tool for a rapid screening of the impact of additives to the cross-linking behavior of gelatine compositions.

TABLE 2

| Sample | # of samples | Ave. Vortex Hardening (sec) | Rel. Std. Dev |
|---|---|---|---|
| High Bloom Limed-Bone Gelatine | 21 | 221.07 | 3.93% |
| 1.5% Glycine | 6 | 292.46 | 4.67% |
| 2.5% Glycine | 6 | 342.69 | 3.43% |
| 0.5% Citrate | 6 | 218.11 | 4.21% |
| 1.5% Citrate | 6 | 177.88 | 3.97% |
| 2.5% Glycine & 0.5% Citrate | 6 | 346.33 | 9.63% |

Figure 1:
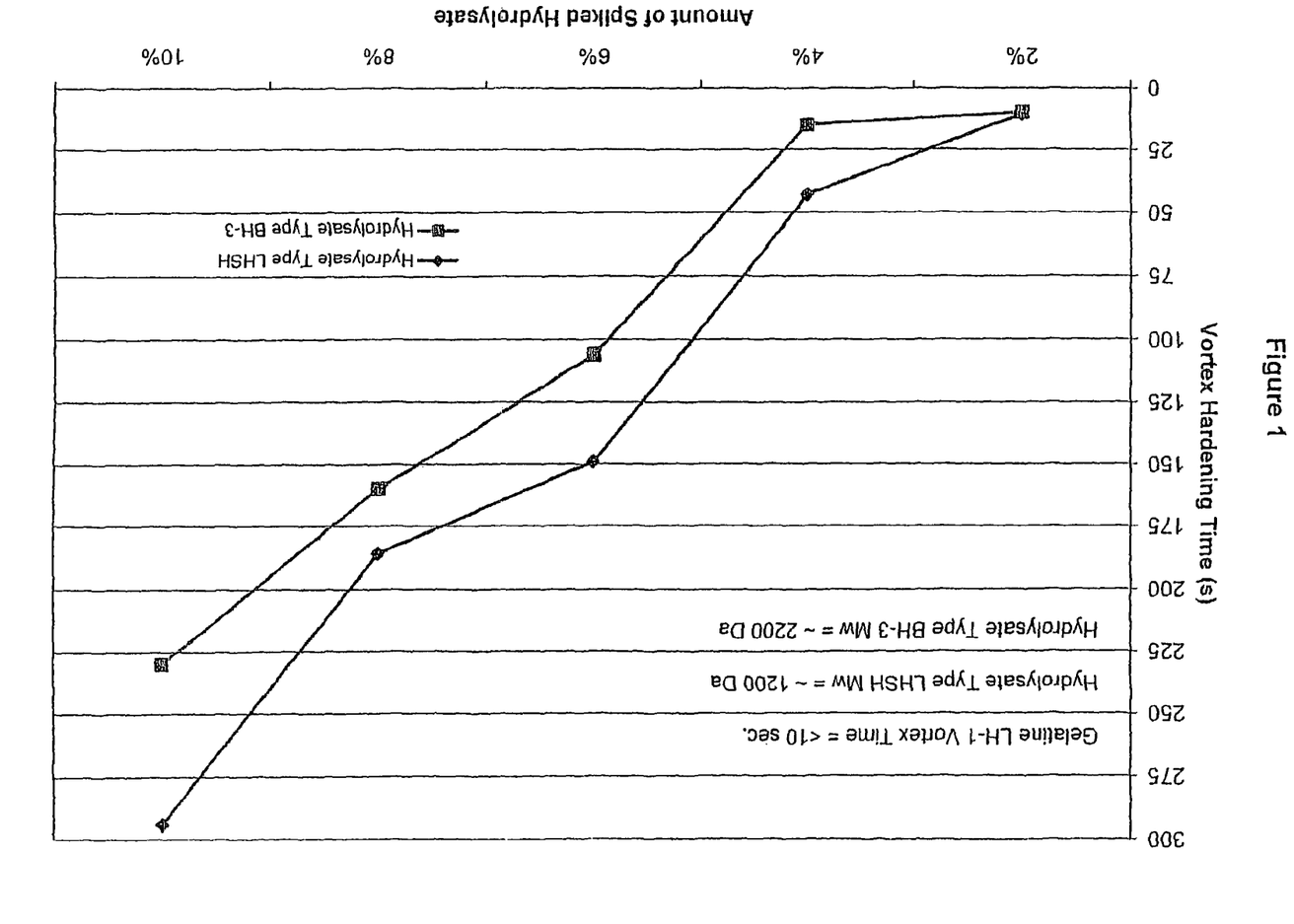
FIG. 1 shows the reduction in formaldehyde induced cross-linking of LH-1, a limed-hide gelatine, upon the addition of 2 different gelatine hydrolysates, Type BH-3 and Type LHSH, as measured by the Vortex Hardening procedure. Hydrolysate Type BH-3 is a low molecular weight limed-hide hydrolysate and Type LHSH is a limed-hide hydrolysate of the present invention.

FIG. 1 details the effects of adding hydrolysate Type LHSH, a limed-hide gelatine hydrolysate obtained in a process similar to Example 1 (MW ~1200 Da), and a Type BH-3 gelatine hydrolysate (MW ~2200 Da) to LH-1, a typical limed-hide gelatine with bloom of 260 g and a 6.67% viscosity of 45 mP. The term 6.67% viscosity is used as an abbreviation for a viscosity observed with a 6.67% CDG solution in water. The results show an increase in the vortex hardening time for both added hydrolysates. However, the performance was better upon the addition of the hydrolysate of the present invention, Type LHSH. Several hide gelatines exhibited this very rapid cross-linking that was previously only seen in limed-bone gelatines with a 6.67% viscosity near 60 mP.

Table 4 shows the results of adding 10% of hydrolysate Type LBSH of Example 1 (average MW=1500), a gelatine hydrolysate Type BB-4, and glycine to a high viscosity limed-bone gelatine with a Bloom of 240 g and 6.67% viscosity of 64 mP. This high viscosity extract exhibits similar cross-linking properties as some limed-hide gelatines with much lower viscosity. This gelatine showed a significant reduction in cross-linking in the presence of all three additives. However, the Type LBSH hydrolysate increased the vortex hardening time by nearly 30% in comparison to the Type BB-4. Glycine showed the greatest reduction in cross-linking and subsequent increase in the vortex hardening time as shown in Table 4.

TABLE 4

| Sample | Ave. Vortex Hardening (sec) | Relative Std. Dev. |
|---|---|---|
| High Viscosity Limed-Bone Control | 28.8 | 40.1% |
| Control w/ 10% Type LBSH | 242.6 | 5.1% |
| Control w/ 10% Type BB-4 | 187.7 | 5.1% |
| Control w/ 10% Glycine | >480 | N/A |

Table 5 shows the results of an experiment trying to determine the amount of low molecular weight hydrolysate needed to match the performance of glycine when added to a medium viscosity limed-bone pharmaceutical gelatine (Bloom=244, 6.67% vis.=47.0 mP) as measured by the vortex hardening test. The results indicate that 4-5% of Type LBSH is needed to match the performance of 2.5% glycine, while 5-6% Type BB-4 is needed. Similarly, 10% Type LBSH and 11-12% Type BB-4 is needed to match the reduction in cross-linking achieved by 5.0% glycine.

TABLE 5

| Sample | Ave. Vortex Hardening (sec) | Rel. Std. Dev. |
|---|---|---|
| Medium Viscosity Limed-Bone Control | 192.5 | 11.1% |
| w/ 2.5% Glycine | 307.8 | 3.1% |

TABLE 5-continued

| Sample | Ave. Vortex Hardening (sec) | Rel. Std. Dev. |
|---|---|---|
| w/ 5.0% Glycine | 506.5 | 3.9% |
| w/ 4.0% Type LBSH | 281.5 | 2.1% |
| w/ 5% Type LBSH | 356.7 | 2.7% |
| w/ 7.5% Type LBSH | 395.9 | 3.7% |
| w/ 10% Type LBSH | 492.2 | 4.0% |
| w/ 5% Type BB-4 | 295.8 | 3.1% |
| w/ 6% Type BB-4 | 323.7 | 0.4% |
| w/ 7.5 Type BB-4 | 339.6 | 0.2% |
| w/ 10.0% Type BB-4 | 434.0 | 2.4% |
| w/ 11.0% Type BB-4 | 483.6 | 3.6% |
| w/ 12.0% Type BB-4 | 519.9 | 3.7% |

Example 3

The gelatine hardening agent OB1207® [2-(4-Dimethyl-carbamoyl-pyridino)-ethane-1-sulfonate] was acquired from H.W. Sands Corporation. OB1207® has been touted as a replacement for formaldehyde in photographic emulsions. Reaction 1 describes the cross-linking of OB1207® with gelatine. The formation of amide and ester bonds between gelatine chains through the reaction with OB1207® may closely mimic the type of cross-linking seen in gelatine samples that have been aged and/or stressed due to exposure to extremes of heat and humidity.

In control experiments, 15.0±0.1 g of gelatine (limed-bone gelatine Type B, Bloom=200) was added into a 250 ml flask. To this, 95.0±0.5 g of de-ionized water and a magnetic stir bar was added. The gelatine was covered with parafilm allowed to swell for 30-60 minutes. The flask was placed into a 60±1.0° C. water bath for 15-20 minutes or until all of the gelatine was dissolved. The viscosity of this solution was measured using a Brookfield DV-III+Rheometer at 50 RPM and 60.0±0.1° C.

A solution made of 0.30 g of OB1207® dissolved in 10.0 g of de-ionized water was slowly added to the gelatine in the flask while stirring on a stir plate. The flask was placed back into the water bath. The viscosity of the solution was measured 2 hours later. In experiments containing the addition of hydrolysates, a percentage of the control gelatine was substituted with the desired hydrolysate (i.e., a 10% hydrolysate added sample contained 13.5 g of gelatine and 1.5 g of hydrolysate).

The results of viscosity experiments involving a medium bloom and viscosity gelatine (LB-1) after cross-linking with OB1207® are given in Table 6. Control A LB-1 had no hydrolysate or OB1207® added, whereas control B LB-1 had no hydrolysate, but was cross-linked with OB1207®. After two hours, Control B was too viscous to read on the Brookfield rheometer indicating a very high degree of cross-linking. The samples containing hydrolysates showed a decreased degree of cross-linking, with the best results achieved with Type LBSH, the hydrolysate of the present invention, especially at the 10% level.

TABLE 6

| Sample | Ave. Initial Vis. (cP) | Ave. Final Vis. (cP) |
|---|---|---|
| Control A LB-1 | 16.2 | 16.5 |
| Control B LB-1 (no additive) | 15.9 | 73.5 |

Reaction 1

TABLE 6-continued

| Sample | Ave. Initial Vis. (cP) | Ave. Final Vis. (cP) |
|---|---|---|
| w/ 5% Type LBSH | 13.2 | 48.6 |
| w/ 5% Type BB-4 | 13.2 | 53.2 |
| w/ 5% Type BB-1a | 14.4 | 69.0 |
| w/ 5% Type BB-1b | 13.2 | 62.4 |
| w/ 10% Type LBSH | 12 | 31.2 |
| w/ 10% Type BB-4 | 11.2 | 39.8 |

TABLE 6-continued

| Sample | Ave. Initial Vis. (cP) | Ave. Final Vis. (cP) |
|---|---|---|
| w/ 10% Type BB-1a | 12.6 | 57.4 |
| w/ 10% Type BB-1b | 12 | 46.8 |

Example 4

The following procedure was used to determine the content of primary amines in the gelatine hydrolysate. The use of trinitrobenzenesulfonic acid (TNBS) to measure the amount of primary amines was described by Alder-Nissen (6). A modified version of this procedure was used to measure the relative amounts of primary amines in gelatine hydrolysates. Reaction 2 depicts the derivatization of a primary amine with TNBS.

Reaction 2

Glycine (Acros) in the amount of 2.000±0.002 g was added to a 250 ml beaker and brought up to a weight of 200.00±0.01 g using a 1% sodium dodecyl sulfate ("SDS", Aldrich) solution (glycine solution now referred to as G-1). Gelatine hydrolysates in the amount of 4.000±0.002 g were added to 250 ml beakers and brought up to a weight of 100±0.01 g using the 1% SDS solution (hydrolysate solution now referred to as H-1). The beakers containing the G-1 and H-1 solutions were placed on a hotplate and heated to a temperature of 80-85° C. to fully dissolve and disperse the solids. The solutions were cooled to room temperature and then 1.00 g of G-1 was added to a 250 ml beaker and brought up to a weight of 200.00±0.01 g using the 1% SDS solution (G-2). Dilutions (G-3 standards) of G-2 were made in 50 ml volumetric flasks by adding 50, 37.5, 25, 12.5, 5, and 0.5 ml of G-2, respectively. The flasks were brought up to the mark by using the 1% SDS solution. The solution H-1 was diluted to create H-2 by adding 1.00 g of H-1 and bringing it up to a weight of 200.00±0.01 g in a 250 ml beaker using the 1% SDS solution. Into a 15 ml test tube was added 2 ml of a 0.2125 M phosphate buffer (made by adding of 0.2125 M $NaH_2PO_4$ to 0.2125 M $Na_2HPO_4$ until a pH of 8.20±0.02 is reached), and 250 μL of the G-3 standards. This corresponds to a six-standard glycine calibration containing 0.1667, 0.1250, 0.0833, 0.0417, 0.0167, and 0.0017 μmoles of primary amines per sample, respectively. Similarly, 250 μl of each H-2 solution was added to a 15 ml test tube (corresponding to 50 μg of sample) along with 2 ml of the phosphate buffer. A control sample is made by adding 250 μl of the 1% SDS solution into a 15 ml test tube with 2 ml of buffer. A 0.1% trinitrobenzene solution was made by adding 170±2 μl of a 1 M TNBS solution (Sigma) into a 50 ml volumetric flask and brought up to the mark with deionized water and immediately covered with aluminum foil as TNBS is light sensitive.

The following steps were all conducted in a photographic dark room. To the test tubes, 2 ml of the 1% TNBS solution was added. The test tubes were then vortexed (Fisher Scientific Vortex Genie 2) for 5 seconds. The samples were then placed into a 50.0±0.1° C. water bath for 30 minutes. The samples were then vortexed for an additional 5 seconds and placed back into the water bath for 30 minutes. The samples were removed from the water bath and 4 ml of 0.100 N HCl solution was added to terminate the TNBS reaction. The solutions were vortexed for 5 seconds and allowed to cool for 10 minutes (longer cooling may lead to turbidity because of the SDS). The absorbance of the each sample was read at 340 nm (Beckman DU-7 Spectrophotometer) against a water blank. The amounts of primary amines in the samples were calculated by using an absorbance-based linear regression calculation of the glycine standards.

Derivatization of primary amines with o-phthaldialdehyde (OPA) to measure proteolysis in milk proteins was described by Church et al (7). Nielsen et al (8) used OPA to measure the degree of hydrolysis in other food proteins, including that of gelatine. An advantage of the Nielsen method is the substitution of the more environmentally friendly dithiothreitol (DTT—Cleland's Reagent) for β-mercaptoethanol as the sulfur-containing reducing agent. This procedure is adapted from the work of Nielson et al. Reaction 3 depicts the reaction of primary amines with OPA in the presence of DTT.

Reaction 3

The OPA reagent was prepared by adding 7.620 g of sodium tetraborate decahydrate (Fisher Scientific) and 200 mg SDS to a 200 ml volumetric flask. Deionized water in the amount of approximately 150 ml was added to and the solution was stirred until completely dissolved. OPA (Aldrich) in the amount of 160 mg was dissolved in 4 ml of ethanol (Fisher Scientific) and quantitatively transferred to the volumetric flask using deionized water. DTT (Aldrich) in the amount of 176 mg was added and the entire solution was brought up to volume with deionized water. Glycine standards were created by adding 50 mg of glycine to a 500 ml volumetric flask and filling to the mark with deionized water. Dilutions were made by adding 100, 75, 50, 25, and 5 ml of the glycine solution to 100 ml volumetric flasks and filling to the mark with deionized water creating 5 glycine standards. Gelatine hydrolysate samples were prepared by adding 0.500 g of hydrolysate to a 100 ml volumetric flask and adding deionized water to the mark. To another 100 ml volumetric flask, 10 ml of the hydrolysate solution was added and filled to the mark with deionized water. To a 15 ml test tube, 3.0 ml of the OPA reagent solution was added followed by 400 μL of either a glycine standard (resulting in 40, 30, 20, 10, and 2 μg of glycine) or gelatine hydrolysate sample (200 μg of hydrolysate). A control sample using 400 μL of water was also used to measure the absorbance of OPA alone. The sample was vortexed for 5 seconds. Absorbance was read exactly 2 minutes after the addition of sample against a water blank. Deviation from the 2-minute requirement significantly impacts absorbance. Each sample or standard was then tested in two minute intervals. The amounts of primary amines in the samples were calculated by using an absorbance-based linear regression calculation of the glycine standards.

Table 7 and Table 8 show the results of TNBS and OPA derivatization of primary amines in 6 gelatine hydrolysates, a first-extract gelatine, a glycine trimer, and a lysine monomer. The degree of hydrolysis is reported as the amount of primary amines divided by the number of primary amines in the HCl hydrolyzed sample (6N HCl for 24 hours @ 110° C.). The TNBS and OPA derived molecular weights are the inverse of the amount of primary amines per sample amount. The TNBS and OPA derived molecular weights are considered only to be qualitative, the real significance being the measured amount of primary amines in each of the samples. The primary amine derived molecular weights do not take into account the double derivatization of lysine and hydroxylysine, nor does it take into account the fact that secondary amines are not derivatized by either derivatizing agent. However, when assuming these factors are relatively constant for all gelatine hydrolysates, the primary amine derived molecular weight is a useful means of comparing the relative degrees of hydrolysis of amongst different types of gelatine hydrolysates. Type LBSH and Type LHSH, limed-bone and limed-hide hydrolysates according to the present invention, showed an average increase of nearly 30-130% in primary amines over other enzymatically digested hydrolysates. The average molecular weight as measured by SEC/HPLC methodology is also given. Note that the molecular weights for lysine and the glycine trimer are far from the known molecular weight values. The TNBS and OPA derived molecular weights are also very similar to the expected results of the HCl hydrolyzed gelatine sample, whereas the HPLC/SEC data is almost 5 times this amount. This demonstrates the relative inaccuracy of low molecular weight SEC/HPLC methodology generally used to measure the molecular weight of gelatine hydrolysates. TNBS and OPA derived molecular weights are not considered for gelatine. The complexities of the gelatine macromolecule inhibit an accurate depiction of molecular weight using this simplified model. The OPA derivatization proves to be a much more reliable means for measuring primary amine content in comparison to derivatization with TNBS.

TABLE 7

| Sample | Ave. μMol Primary amines/μg | | Relative Std. Dev. | | Degree of Hydrolysis | | Ave. Derived Molecular Weight (Da) | | |
|---|---|---|---|---|---|---|---|---|---|
|  | TNBS | OPA | TNBS | OPA | TNBS | OPA | TNBS | OPA | SEC |
| Type LBSH | 1.05E−03 | 1.10E−03 | 11.7% | 2.8% | 14.1% | 14.5% | 952 | 911 | ~1800 |
| Type LHSH | 1.02E−03 | 1.07E−03 | 13.7% | 1.3% | 13.7% | 14.1% | 980 | 936 | — |
| Type BB-4 | 7.52E−04 | 8.56E−04 | 18.6% | 2.6% | 10.1% | 11.3% | 1330 | 1169 | ~1900 |
| Type BB-1a | 4.53E−04 | 4.91E−04 | 46.8% | 2.4% | 6.1% | 6.5% | 2209 | 2035 | ~3000 |
| Type BB-1b | 5.26E−04 | 5.54E−04 | 30.8% | 2.0% | 7.1% | 7.3% | 1902 | 1805 | ~3500 |
| Gelatine | 2.31E−04 | 3.39E−04 | 2.3% | 1.0% | 3.1% | 4.5% | — | — | — |
| HCl Hydrolysate | 7.43E−03 | 7.57E−03 | 5.3% | 0.7% | 100.0% | 100.0% | 135 | 132 | ~750 |
| Gly-Gly-Gly | 3.66E−03 | 4.98E−03 | 13.3% | 0.7% | — | — | 273 | 201 | ~800 |
| Lysine | 6.43E−03 | 5.85E−03 | 10.1% | 0.7% | — | — | 156 | 171 | ~900 |

TABLE 8

| Sample | Ration of Primary Amines Compared to HCl Hydrolysate | | Ratio of Primary Amines Compared to Type LBSH | | Ratio of Primary Amines Compared to Gelatine | |
|---|---|---|---|---|---|---|
|  | TNBS | OPA | TNBS | OPA | TNBS | OPA |
| Type LBSH | 0.14 | 0.14 | 1.00 | 1.00 | 4.56 | 3.24 |
| Type LHSH | 0.14 | 0.14 | 0.97 | 0.97 | 4.43 | 3.15 |
| Type BB-4 | 0.10 | 0.11 | 0.72 | 0.78 | 3.26 | 2.52 |
| Type BB-1a | 0.06 | 0.06 | 0.43 | 0.45 | 1.96 | 1.45 |
| Type BB-1b | 0.07 | 0.07 | 0.50 | 0.50 | 2.28 | 1.63 |
| Gelatine | 0.03 | 0.04 | 0.22 | 0.31 | 1.00 | 1.00 |
| HCl Hydrolysate | 1.00 | 1.00 | 7.08 | 6.90 | 32.24 | 22.34 |

REFERENCES

All references cited in the preceding text of the patent application or in the following reference list, to the extent that they provide exemplary, procedural, or other details supplementary to those set forth herein, are specifically incorporated by reference to the same extent as if each individual publication or patent application was specifically and individually indicated to be incorporated by reference.

1. Ofner, C. M., Zhang, Y., Jobeck, V., Bowman, B., "Crosslinking Studies in Gelatin Capsules Treated with Formaldehyde and in Capsules Exposed to Elevated Temperature and Humidity". *J. Pharm. Sci.*, January 2001, 90(1): 79-88.

2. Singh, S., Rama Rao, K. V., Venugopal, K. Manikandan, R., "Dissolution Characteristics: A Review of the Problem, Test Methods, and Solutions". *Pharmaceutical Technology*. April 2002; 36-58.
3. Adesunloye, T. A., Stach, P. E., "Effect of Glycine/Citric Acid on the Dissolution Stability of Hard Gelatin Capsules". *Drug Dev. Ind. Pharm.*, 1998, 24(6), 493-500.
4. Rama Rao, K. V., Pakhale, S. P., Singh, S., "A film Approach for the Stabilization of Gelatin Preparations Against Cross-Linking". *Pharmaceutical Technology*. April 2003: 54-63.
5. Fraenkel-Conrat, H., Olcott, H., "Reaction of Formaldehyde with Proteins. II. Participation of Guanidyl Groups and Evidence of Crosslinking". *J. Am. Chem. Soc.*, January 1946, 68(1): 34-37.
6. Adler-Nissen, J., "Determination of the Degree of Hydrolysis of Food Protein Hydrolysates by Trinitrobenzene Sulfonic Acid", *J. Agric. Food Chem.*, November-December 1979, 27(6): 1256-62.
7. Church, F., et al, "Spectrophotometric Assay Using o-phthaldialdehyde for Determination of Proteolysis in Milk and Isolated Milk Proteins". *J. of Dairy Sci.*, 1983, 66(6): 1219-1227.
8. Nielsen, P. M., Petersen, D., Dambmann, C., "Improved Method for Determining Food Protein Degree of Hydrolysis". *J. of Food Sci.*, 2001, 66(5): 642-646.
9. Fraenkel-Conrat, H., Cooper, M., Olcott, H., "The Reaction of Formaldehyde with Proteins". *J. Am. Chem. Soc.*, June 1945, 67(6): 950-954.
10. Fraenkel-Conrat, H., Olcott, H., "The Reaction of Formaldehyde with Proteins V. Cross linking between Amino and Primary Amide or Guanidyl Groups". *J. Am. Chem. Soc.*, August 1948, 70(8): 2673-2684.
11. Ward, A. G., Courts, A., *The Science and Technology of Gelatin*. Academic Press Inc. 1977, pp. 231.
12. Davis, P., Tabor, B., "Kinetic Study of the Crosslinking of Gelatin by Formaldehyde and Glyoxal". *J. Polym. Sci. Part A.*, 1963, 1: 799-815.
13. Albert, K., Peters, B., Bayer, E., Treiber, U., Zwilling, M., "Crosslinking of Gelatin with Formaldehyde; a $^{13}$C NMR Study". *Z. Natufforsch.*, 1986, 41b: 351-358
14. Gold, T. B., et al., "Studies on the Influence of pH and Pancreatin on $^{13}$C-Formaldehyde-Induced Gelatin Cross-Links Using Nuclear Magnetic Resonance". *Pharm. Dev. Tech.*, 1996, 1(1): 21-26.
15. Matsuda, S., Iwata, H., Se, N., Ikada, Y., "Bioadhesion of Gelatin Films Crosslinked with Glutaraldehyde". *J Biomed Mater. Res.* April 1999; 45(1):20-7.
16. Jiskoot, W., et al., "Identification of Formaldehyde-induced Modifications in Proteins: Reaction with Model Peptides". *J. Bio. Chem., February* 2004, 279(8): 6235-6243.
17. Digenis, G. A., Gold, T. B., Shah, V. P., "Cross-Linking of Gelatin Capsules and its Relevance to Their in Vitro-in Vivo Performance". *J. Pharm. Sci.*, July 1994, 83(7):915-921.
18. Nagaraj, R. H., Shipanova, I. N., Faust, F. M., "Protein Cross-Linking by the Maillard Reaction". *J. Biol. Chem.*, August 1996, 271(32):19338-19345.
19. "Enzymic Hydrolysis of Food Proteins"; Elsevier Applied Science Publishers Ltd. (1986), page 122.

What is claimed is:

1. A process for making a gelatine hydrolysate, the process comprising:
    (a) contacting a gelatine starting material with a series of at least three different proteolytic enzymes having endopeptidase activity to form an endopeptidase digested gelatine product, the three proteolytic enzymes being selected from the group consisting of Endopeptidase from *Bacillus subtilis*, Bromelain, and Papain; and
    (b) contacting the endopeptidase digested gelatine product with a series of at least two different proteolytic enzymes having exopeptidase activity, the two proteolytic enzymes being selected from the group consisting of Exopeptidase from *Aspergillus oryzae* and Exopeptidase from *Aspergillus sojae*,
    wherein the endopeptidase and exopeptidase proteolytic digestions form the gelatine hydrolysate, the gelatine hydrolysate having an average primary amine content from $1.0 \times 10^{-3}$ to $1.0 \times 10^{-2}$ μMol of primary amine per μg of gelatine hydrolysate.

2. The process according to claim 1, wherein the proteolytic enzymes having endopeptidase activity which are contacted with the gelatine starting material have a concentration of about 0.025% to about 0.15% (w/w) and the proteolytic enzymes having exopeptidase activity which are contacted with the endopeptidase digested gelatine product have a concentration of about 0.025% to about 0.15% (w/w).

3. The process of claim 1, wherein each proteolytic enzyme is sequentially added to the gelatine starting material in the following order: Endopeptidase from *Bacillus subtilis*, Bromelain, Papain, Exopeptidase from *Aspergillus oryzae* and Exopeptidase from *Aspergillus sojae*; and wherein each proteolytic enzyme digests the gelatine starting material for approximately 0.5 to about 2 hours before addition of the subsequent proteolytic enzyme.

4. The process according to claim 1, wherein the proteolytic digestions are allowed to proceed for about 5 to about 12 hours in total.

5. The process according to claim 1, wherein an aqueous solution containing about 10% to about 50% (w/w) of the gelatine starting material is contacted with the proteolytic enzymes.

6. The process according to claim 1, wherein the gelatine starting material is a pharmaceutical grade gelatine.

7. The process according to claim 1, wherein the proteolytic digestions are conducted at a pH of about 5 to about 7 and at a temperature of about 40° C. to about 65° C.

* * * * *